United States Patent [19]
Courtemanche

[11] Patent Number: 6,109,705
[45] Date of Patent: Aug. 29, 2000

[54] SNOWMOBILE DRIVE TRACK FOR TRAVELING ON ICY AND HARDENED SNOW SURFACE

[75] Inventor: Denis Courtemanche, Richmond, Canada

[73] Assignee: Camoplast, Inc., Canada

[21] Appl. No.: 09/131,055

[22] Filed: Aug. 7, 1998

[51] Int. Cl.[7] .................................................. B62D 55/27
[52] U.S. Cl. ........................ 305/178; 305/179; 305/181
[58] Field of Search .................................. 305/157, 160, 305/165, 167, 178, 179, 180, 181

[56] References Cited

U.S. PATENT DOCUMENTS

| | | | |
|---|---|---|---|
| 2,040,696 | 5/1936 | Johnston | 305/171 |
| 3,762,779 | 10/1973 | Russ, Sr. | 305/178 |
| 3,767,275 | 10/1973 | Russ, Sr. | 305/179 |
| 3,865,441 | 2/1975 | Jolliffe | 305/160 X |
| 4,278,302 | 7/1981 | Westimayer et al. | 305/181 X |
| 4,938,546 | 7/1990 | Simmons | 305/165 X |
| 5,709,440 | 1/1998 | Lecours | 305/165 X |
| 5,713,645 | 2/1998 | Thompson et al. | 305/179 X |
| 5,730,510 | 3/1998 | Courtemanche et al. | 305/178 X |

FOREIGN PATENT DOCUMENTS

| | | | |
|---|---|---|---|
| 40299 | 7/1965 | Germany | 305/157 |
| 632607 | 11/1978 | U.S.S.R. | 305/174 |
| 770904 | 10/1980 | U.S.S.R. | 305/160 |

Primary Examiner—Russell D. Stormer
Attorney, Agent, or Firm—Quarles & Brady LLP

[57] ABSTRACT

A snowmobile drive track for travelling on various surfaces including icy surfaces, hardened snow surfaces and semi-hardened surfaces comprises an endless body having, on its ground engaging outer side, projecting profiles having peaks of different height. The first highest peaks bear on icy surfaces, while, on hardened snow surfaces, the second highest peaks also engage the ground; on semi-hardened snow surfaces, all peaks engage the ground.

17 Claims, 3 Drawing Sheets

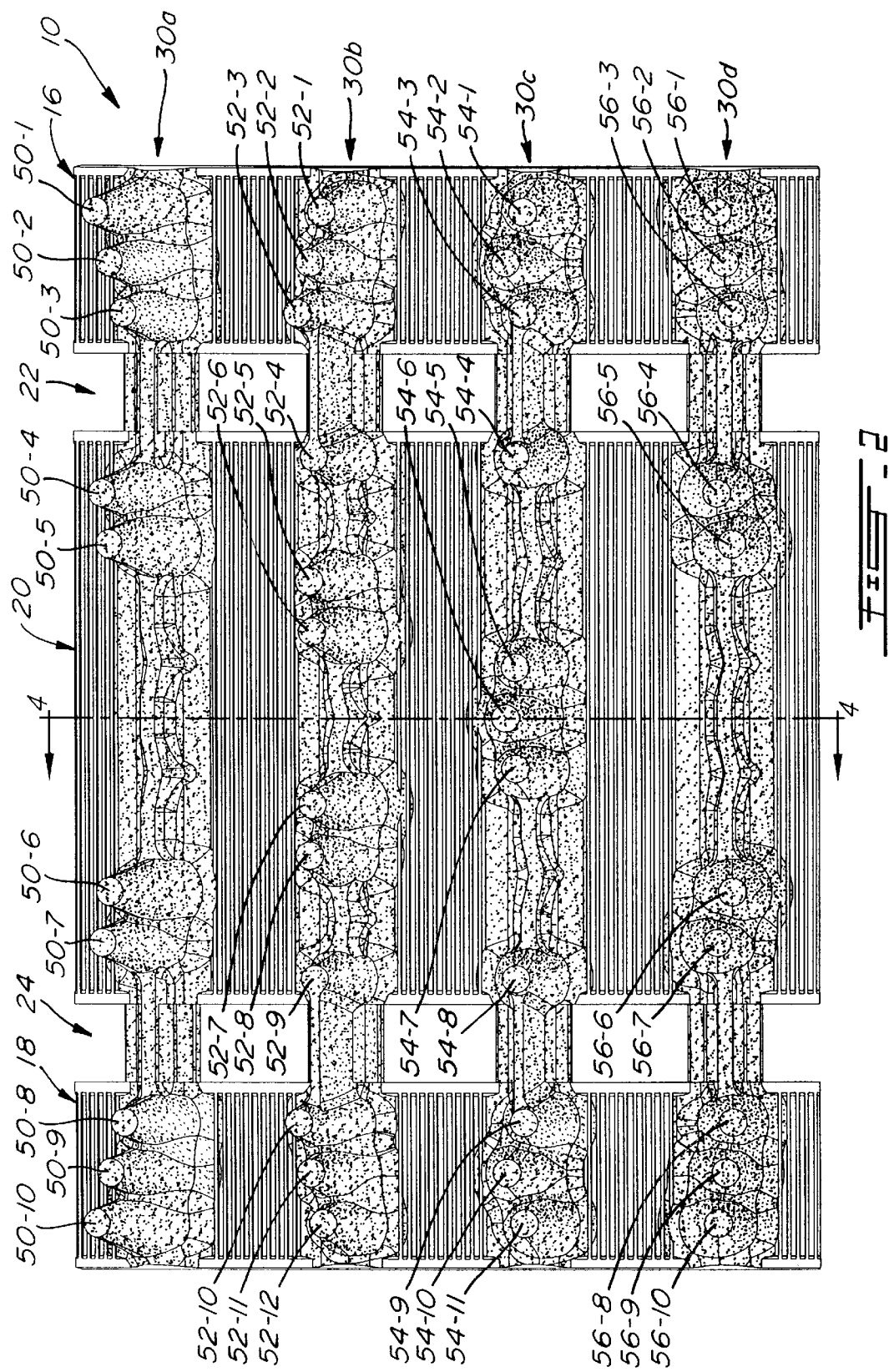

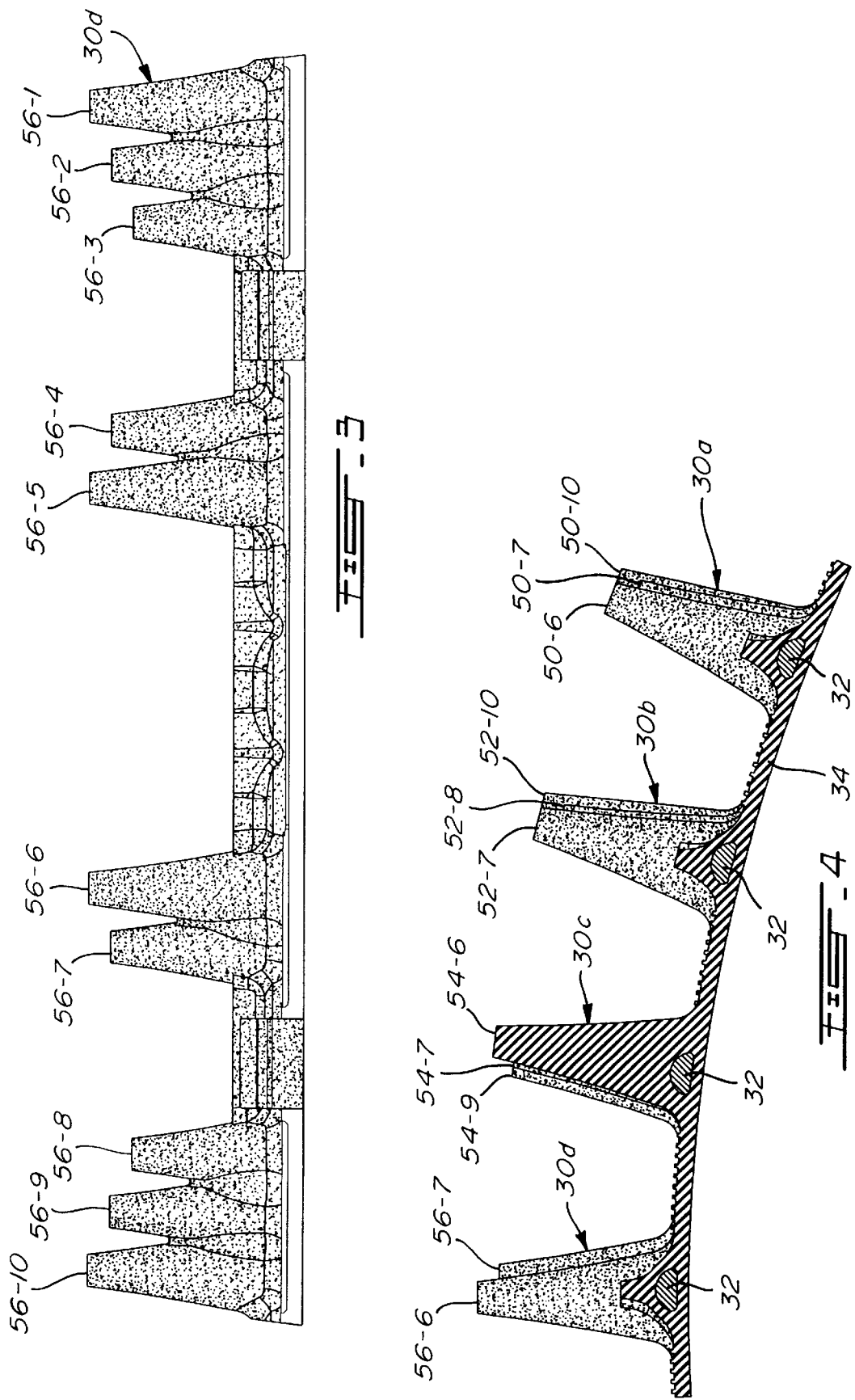

SNOWMOBILE DRIVE TRACK FOR TRAVELING ON ICY AND HARDENED SNOW SURFACE

FIELD OF THE INVENTION

The present invention relates to a snowmobile drive track configured for travelling on various surfaces including icy surfaces, hardened snow surfaces and semi-hardened snow surfaces.

BACKGROUND OF THE INVENTION

Snowmobile tracks are formed of an assembly of a molded rubber base having, imbedded therein, one or more layers of reinforcing fabric and a series of bars that extend crosswise of the track in central and lateral portions thereof. These crossbar portions display a series of raised profiles, each defining a ground engaging projection which provides traction and controlled of the track.

Snowmobiles travel on various types of surfaces; the surfaces may be icy or they may be formed of compact snow, the latter including hardened snow surfaces and semi-hardened snow surfaces.

It is of great importance that maximum traction be obtained from the track profiles on an icy surface; this can be achieved by diminishing load distribution on all profiles and by concentrating it on fewer profiles.

On the other hand, profiles are a source of noise pollution at certain rotational speeds of the track. Indeed, at speeds of between 40 and 70 mph, noise produced by the track is easily heard; however, above 70 mph, motor noise usually takes over track noise.

OBJECT AND STATEMENT OF THE INVENTION

It is an object of the present invention to provide a snowmobile drive track for travelling on various types of surfaces such as icy surfaces, hardened snow surfaces and semi-hardened snow surfaces. This is achieved by providing a track which has a less number of profile peaks when the snowmobile drive track is in contact with an icy surface than when the snowmobile drive track travels on compact snow surfaces.

The present invention therefore relates to a snowmobile drive track which comprises an endless body having a ground engaging outer side and a suspension supporting inner side; the body defines a central portion and opposite lateral portions interconnected by a plurality of longitudinally spaced suspension bearing sections. The body displays a plurality of longitudinally spaced crossbar receiving areas extending crosswise of the body in the central, lateral and suspension bearing portions; each crossbar receiving area displaying, on the outer side of the body, integrally formed projecting profiles. Each profile of a crossbar receiving area is formed of a series of ground engaging peaks and each profile is characterized by peaks of at least three different heights, including a highest first peak, an intermediate second high peak and a lowest third peak whereby only the first peaks will bear on an icy surface; however, the first and second peaks will engage an hardened snow surface and all peaks will engage a semihardened snow surface.

It is also an object of the present invention to provide a snowmobile drive track where noise is greatly reduced. This is achieved by providing the outer side of the snowmobile drive track with a tread configuration that includes peak free regions to reduce the frequency which results in noise reduction.

The present invention also relates to a snowmobile drive track as described above wherein the profiles of three successive crossbar receiving areas define a tread pattern which is identically repeated on all successive threesome of crossbar receiving areas; the profiles of at least one of the three successive crossbar receiving areas differ in configuration from the profiles of the others. Each crossbar receiving area includes a profile free region thereon but the track is free of profile free regions when viewed in a longitudinal direction to thereby provide noise reduction when said track is driven.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION THE DRAWINGS

FIG. 2 is a top plan view showing part of the ground engaging outer side of the track;

FIG. 3 is a frontal elevational view of one profile configuration of the track; and FIG. 4 is a cross sectional view taken along lines 4—4 of FIG. 2.

DESCRIPTION OF PREFERRED EMBODIMENTS

Figure 1:
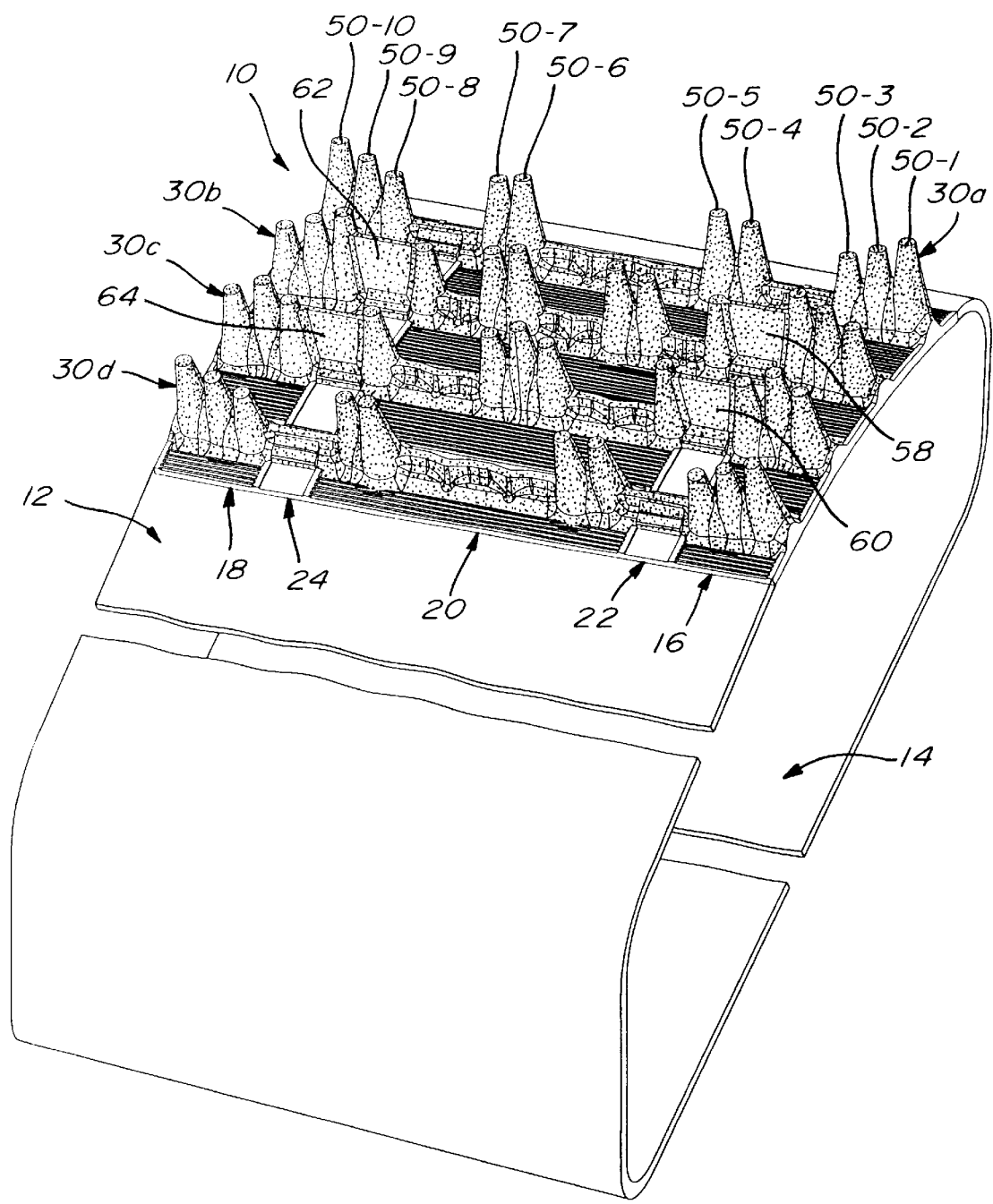
FIG. 1 is a perspective view of a portion of a snowmobile drive track bearing a tread design made in accordance with the present invention.

Referring to FIG. 1, there is shown, in part, an endless snowmobile track, generally denoted 10, for propelling a snowmobile over snow, ice and other similar ground structure. The mounting of this track to a snowmobile is well known and needs not be detailed. The track has a ground engaging outer side 12 and an inner side 14 that receives and supports, on the lower run thereof, a suspension assembly which may consist of a wheel assembly or of a slide rail assembly, both of which are also well known in the art.

Conventionally, the track rotates by means of a motor driven sprocket unit at the forward end of the vehicle and idler drive wheels are mounted at the aft end of the vehicle to support the rear end of the track. A series of sprocket engaging lugs (not shown) are integrally formed to the inner surface of the track.

As illustrated in FIG. 2, the track defines a pair of opposite lateral portions 16 and 18 and a central portion 20. These portions are interconnected by a plurality of longitudinally spaced suspension bearing portions 22 and 24 which are each partially covered by metallic lips (not shown). These clips may have various forms; however, they are structured so that, in the case of slide rails suspension system, the rails that support the chassis of the snowmobile slide on the rear faces of the clips. Such clips may be found described in U.S. Pat. No. 4,474,414 issued Oct. 2, 1994 to Tokue.

The snowmobile track 10 also defines a plurality of cross bar receiving areas 30 that extend transversally through the central, lateral and suspension bearing portions of the track. As seen in to FIG. 4, these areas incorporate a crossbar 32 which preferably consists of a rod made of a composite material, having a shape as illustrated with rounded corners.

As can be seen in FIG. 4, the track is formed of an assembly of a molded rubber base 34 in which are usually mounted layers of reinforcing fabric (not shown). Some track may also include a plurality of longitudinally extending cords. The reinforcing fabric is a woven fabric of synthetic fibers while cords, when present, may be plastic or metal.

In FIGS. 1, 2 and 4, there have been shown four crossbar receiving areas identified as 30a, 30b, 30c and 30d. These crossbar receiving areas are continuously provided all along the track. It should be noted that the configuration of the profile arrangement of crossbar receiving areas 30a, 30b and 30c are all different from one another while the configuration of the crossbar receiving area 30d is identical to the crossbar receiving area 30a. A more detailed description of this configuration and its function will be given further hereinbelow.

The profiles of each crossbar receiving areas is formed of a series of frustro-conical shaped peaks or projections. There are ten projections shown in profile 30a; they have been identified as 50-1 to 50-10. There are twelve projections in profile configuration 30b which have been identified as 52-1 to 52-12. There are eleven projections defined in profile configuration 30c and they have been identified as 54-1 to 54-11.

The profiles may or may not include rectangular shaped projections 58, 60, 62 and 64.

In the embodiment illustrated, projections of three different heights are provided in each profile configuration. For example, for profile configuration 30d (see FIG. 3), projections 56-1, 56-5, 56-6 and 56-10 have the highest peaks. The second highest peaks in this profile configuration are projections 56-2, 564, 56-7 and 56-9. The lowest peaks are 56-3 and 56-8. All of the frustro-conical shaped projections have a flat circular top face. When a snowmobile equipped with a track of the present invention travels on an icy surface, only the highest peaks, 56-1, 56-5, 56-6 and 56-10 will bear on the icy surface so that the maximum weight of the snowmobile is distributed over a less number of ground engaging projections, thereby providing greater traction. On a hardened snow surface, the second highest peaks 56-2, 56-4, 56-7 and 56-9 will engage the ground surface together with the previously mentioned highest peaks. On a semi-hardened surface, the other peaks 56-3 and 56-8 will cooperate with the other peaks of the profile to provide traction. In soft snow, the entire track evidently engages the ground.

It has been found that, on certain tracks, the height difference between successive peaks is ½" while, in other tracks, it is ⅛".

Therefore, in the first case, a preferred track would be one where the highest peak is 2¼", the second peak is 2" and the third peak is 1¾". In the other case, one preferred track would have the highest peak at 1¼", the second peak at 1⅛" and the third peak at 1", and a second preferred track would have the highest peak at 1", the second peak at ⅞" and the third peak at ¾".

Although the track illustrated in the drawings comprises peaks of three different heights, it is foreseeable to provide a track with only the highest first and second peaks.

Another feature of the present invention is that between the projections of each configuration of a profile, there are provided profile free regions. This feature is also described in applicant's U.S. Pat. No. 5,730,510 issued Mar. 24, 1998 and is incorporated herein. In the present embodiment as well as in the track illustrated in the mentioned patent, there are provided profiles of three successive crossbar receiving areas 30a, 30b and 30c that define a tread pattern which is identically repeated on all successive threesome of crossbar receiving areas (i.e. profile 30d is identical to profile 30a).

The profiles of at least one of the three successive crossbar receiving areas differ in configuration from the profiles of the other two.

Indeed, the profiles of the three successive cross bar receiving areas 30a, 30b, 30c differ in crosswise configuration from one another. For example, the crossbar receiving area 30c displays three laterally spaced groups of cone projections, two of which being located in the opposite lateral portions of the body and a third in the central portion of the body. The crossbar receiving areas 30a and 30b display two groups of projections separated by profile free regions in the central portion of the body and one group of cone-shaped projections in each opposite lateral portion of the track.

Although each crossbar receiving area displays a profile free region, the track is free of profile free regions when viewed in a longitudinal direction, that is when viewing the track shown in FIG. 1 in the longitudinal direction thereof.

Although the invention has been described above with respect with specific forms, it will be evident to a person skilled in the art that it may be modified and refined in various ways. For example, it is possible to have a tread pattern where two of the tree successive crossbar receiving areas have the same profile configuration, but which is different from that of the third crossbar receiving area. It is therefore wished to have it understood that the present invention should not be limited in scope, except by the terms of the following claims.

What is claimed is:

1. A snowmobile drive track for travelling on various surfaces including icy surfaces, hardened snow surfaces and semi-hardened snow surfaces, comprising an endless body having a ground engaging outer side and a suspension supporting inner side; said body defining a central portion and opposite lateral portions interconnected by a plurality of longitudinally spaced crossbar receiving areas extending crosswise of said body in said central, lateral and suspension bearing portions; each said crossbar receiving area displaying, on said outer side of said body, integrally formed projecting profiles; each profile of a crossbar receiving area being formed of a series of co-planar ground engaging peaks; each profile being characterized by peaks of at least three different heights including a highest peak first, an intermediate second peak and a lowest third peak whereby only said first peaks bear on icy surfaces, said first and second peaks engage hardened snow surfaces and all peaks engage semi-hardened snow surfaces.

2. A snowmobile drive track as defined in claim 1, wherein said peaks have a frustro-conical shape.

3. A snowmobile drive track as defined in claim 1, wherein said peaks have a circular flat top face.

4. A snowmobile drive track as defined in claim 1, wherein the profiles of three successive crossbar receiving areas define a tread pattern which is identically repeated on all successive threesome of crossbar receiving areas; the profiles of at least one of said three successive crossbar receiving areas differing in configuration from the profiles of the others; each said crossbar receiving area including a profile free region thereon but said track being free of profile free regions when viewed in a longitudinal direction to thereby provide noise reduction when said track is driven.

5. A snowmobile drive track as defined in claim 4, wherein the profiles of each of said three successive crossbar receiving areas differ in crosswise configuration from one another.

6. A snowmobile drive track as defined in claim 5, wherein a first of said three successive crossbar receiving areas displays three laterally spaced groups of projections, two of which being located in said opposite lateral portions of said body and a third in said central portion of said body.

7. A snowmobile drive track as defined in claim 6, wherein a second and a third of said three successive crossbar receiving areas each display a pair of groups of projections separated by a profile-free region in said central portion of said body.

8. A snowmobile drive track as defined in claim 1, wherein the highest peaks of three longitudinally spaced successive profiles are in different longitudinal planes of the track.

9. A snowmobile drive track as defined in claim 1, wherein the second peaks of three longitudinally spaced successive profiles are in different longitudinal planes of the track.

10. A snowmobile drive track as defined in claim 1, wherein the high first peaks of two longitudinally spaced successive profiles are in different longitudinal planes of the track.

11. A snowmobile drive track as defined in claim 1, wherein said highest peak is 2¼" high, said second peak is 2" high and said third peak is 1¾ high.

12. A snowmobile drive track as defined in claim 1, wherein said highest peak is 1¼" high, said second peak is 1⅛" high and said third peak is 1" high.

13. A snowmobile drive track as defined in claim 1, wherein said highest peak is 1" high, said second peak is ⅞" high and said third peak is ¾" high.

14. A snowmobile track as defined in claim 1, wherein the difference in successive heights is ¼".

15. A. A snowmobile track as defined in claim 1, wherein the difference in successive heights is ⅛".

16. A snowmobile drive track for travelling on various surfaces including icy surfaces and hardened snow surfaces, comprising an endless body having a ground engaging outer side and a suspension supporting inner side; said body defining a central and opposite lateral portions interconnected by a plurality of longitudinally spaced suspension bearing sections; said body displaying a plurality of longitudinally spaced crossbar receiving areas extending crosswise of said body and said central, lateral and suspension bearing portions; each said crossbar receiving area displaying, on said outer side of said body, integrally formed projecting profiles; each profile of a crossbar receiving area being formed of a series of ground engaging frusto-conical projections; each profile being characterized by projections having peaks of at least two different heights including a high first peak and a low second peak whereby said first peaks bear on icy surfaces and said first and second peaks engage hardened snow surfaces; said profiles having peaks defining a frustro conical shape.

17. A snowmobile drive track as defined in claim 16, wherein said peaks have a circular flat top face.

* * * * *